United States Patent
Miller

[15] 3,640,347
[45] Feb. 8, 1972

[54] ROTARY HOE

[72] Inventor: Harry T. Miller, 2209 Miller Road, Flint, Mich. 48503

[22] Filed: July 1, 1969

[21] Appl. No.: 838,147

[52] U.S. Cl. ............................................. 172/349, 172/371
[51] Int. Cl. ............................................................ A01b 1/00
[58] Field of Search ............................ 172/349, 15, 601, 371

[56] References Cited

UNITED STATES PATENTS

| 805,252 | 11/1905 | Winters | 172/349 |
| 878,715 | 2/1908 | Ergenbright | 172/349 X |
| 1,100,620 | 6/1914 | Robinson | 172/601 |
| 1,801,036 | 4/1931 | Cole | 172/349 X |
| 2,587,106 | 2/1952 | Brown | 172/349 |
| 3,058,531 | 10/1962 | Beaman et al. | 172/15 |

Primary Examiner—Robert E. Pulfrey
Assistant Examiner—Stephen C. Pellegrino
Attorney—Clarence A. O'Brien and Harvey B. Jacobson

[57] ABSTRACT

A manually operable hoe having a handle, a frame and rotary discs on caster axles extending outward angularly from the frame. The hoe provides the same rolling action as an ordinary farm disc.

2 Claims, 7 Drawing Figures

PATENTED FEB 8 1972
3,640,347
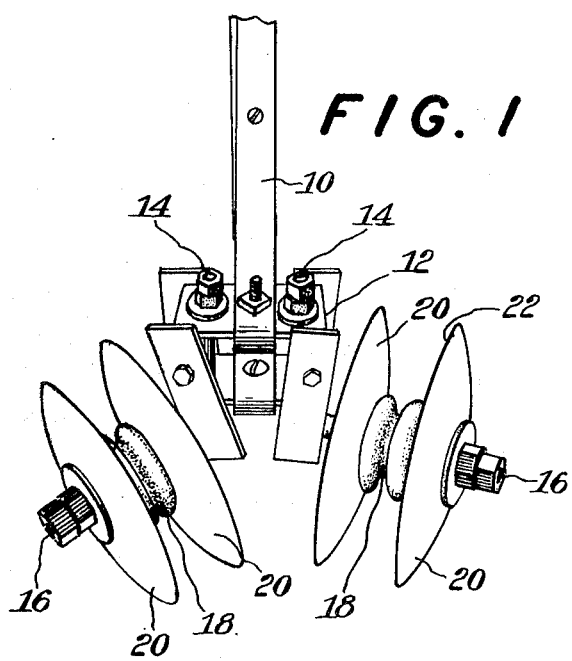
FIG. 1
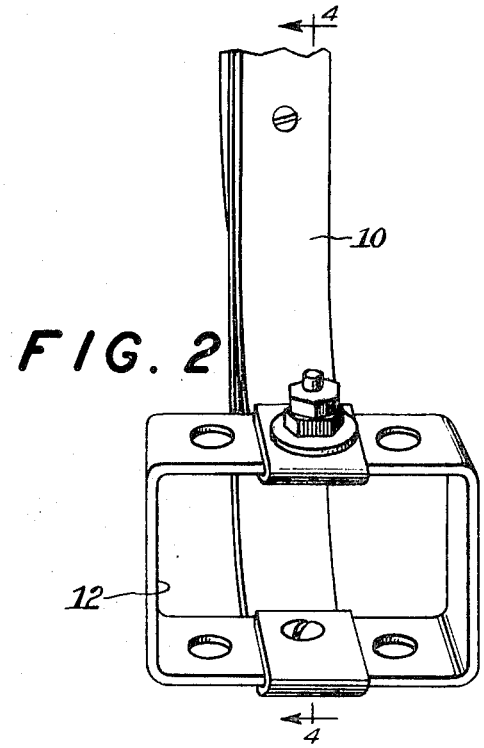
FIG. 2
FIG. 3
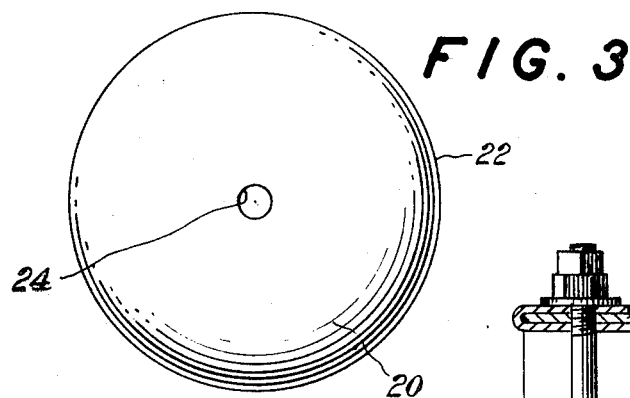
FIG. 4
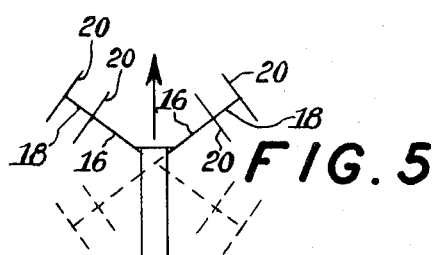
FIG. 5
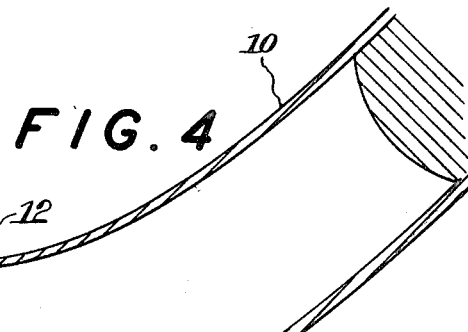
FIG. 6
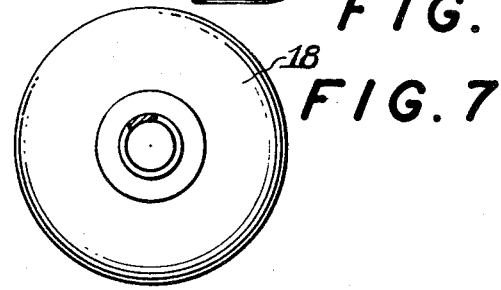
FIG. 7
INVENTOR.
HARRY T. MILLER

ROTARY HOE

SUMMARY OF THE INVENTION

An elongated handle is provided with a frame. First and second L-shaped members have vertical and horizontal legs. Each vertical leg is disposed rotatably in the frame. Each horizontal leg has a concentric sleeve rotatable thereabout. First and second circular discs having peripheral edges are secured to opposite ends of each sleeve and rotate therewith.

As a result when the handle is pushed or pulled, the discs rotate and turn soil and weeds over rather than just digging same in the soil as in an ordinary hoe.

BRIEF DESCRIPTION OF THE DRAWINGS

In the drawings:
FIG. 1 is a perspective front view of my invention;
FIG. 2 is a detail view of the handle and frame;
FIG. 3 is a front view of one disc;
FIG. 4 is a detail side view of the frame;
FIG. 5 is a top view illustrating movement of the discs;
FIG. 6 is a detail view of the axle or sleeve; and
FIG. 7 is a view taken along line 7—7 in FIG. 6.

DETAILED DESCRIPTION OF PREFERRED EMBODIMENTS

Referring now to FIGS. 1–7, an elongated handle 10 supports at one end a hollow frame 12. Two vertical legs 14 of two L-shaped members also having horizontal legs or stub axle portions 16 are rotatably disposed about their own axes at opposite sides of the frame. First and second dumbbell-shaped hollow sleeves 18 each have first and second circular discs 20 with peripheral cutting edges 22 secured to opposite ends of the sleeve and rotate therewith. Each disc has a central hole 24 aligned with the bore in the sleeve. Each sleeve is concentrically and rotatably disposed about a corresponding leg 16.

FIG. 5 illustrates the action of the discs when pushing or pulling forces are exerted on the handle.

The hoe is then used as previously described. It need never be lifted from the soil and gives ease of handling around plants and under shrubs.

While I have described my invention with particular reference to the drawings, such is not to be considered as limiting its actual scope.

Having thus described this invention, what is asserted as new is:

1. A hand hoe comprising an elongated handle for support in an inclined position, a pair of opposite side horizontally and laterally outwardly projecting stub axles having one set of upstanding end portions thereof supported from the lower end portion of said handle for free independent limited oscillation about upstanding axes disposed on opposite sides of a vertical plane in which the opposite ends of said handle are disposed, disc means journaled on the other set of end portions of said stub axles, the other set of end portions of said stub axles being swingable through arcs extending on both sides of a horizontal transverse axis disposed generally normal to said handle.

2. The combination of claim 1 wherein said upstanding axes are vertically disposed.

* * * * *